(12) United States Patent
Johnson et al.

(10) Patent No.: US 6,918,673 B2
(45) Date of Patent: Jul. 19, 2005

(54) PROTECTIVE OPTICAL FILTER ASSEMBLY

(75) Inventors: Robert L. Johnson, West Brattleboro, VT (US); Natalia Gorawski, Walpole, NH (US); Barry O'Dwyer, Harrisville, NH (US)

(73) Assignee: Omega Optical, Inc., Brattleboro, VT (US)

( * ) Notice: Subject to any disclaimer, the term of this patent is extended or adjusted under 35 U.S.C. 154(b) by 130 days.

(21) Appl. No.: 10/224,537

(22) Filed: Aug. 20, 2002

(65) Prior Publication Data

US 2003/0133208 A1 Jul. 17, 2003

Related U.S. Application Data

(60) Provisional application No. 60/348,270, filed on Jan. 15, 2002.

(51) Int. Cl.[7] ............................................. G02B 7/00
(52) U.S. Cl. .................. 359/513; 359/507; 359/580; 359/590; 359/890; 359/892
(58) Field of Search ........................ 359/580, 507, 359/512, 513, 514, 892, 894, 890, 590; 156/99, 107; 428/33, 34; 2/443

(56) References Cited

U.S. PATENT DOCUMENTS

| | | | | |
|---|---|---|---|---|
| 2,087,802 A | * | 7/1937 | De Bayer-Krucsay | 351/44 |
| 2,355,015 A | * | 8/1944 | Splaine et al. | 2/437 |
| 2,373,388 A | * | 4/1945 | Fischer | 2/440 |
| 3,775,914 A | | 12/1973 | Patil | |
| 3,935,351 A | | 1/1976 | Franz | |
| 4,887,887 A | * | 12/1989 | Hart | 359/830 |
| 4,969,716 A | | 11/1990 | Scobey et al. | |
| 5,147,694 A | | 9/1992 | Clarke | |
| 5,177,641 A | * | 1/1993 | Kobayashi et al. | 359/820 |
| 6,111,359 A | * | 8/2000 | Work et al. | 315/56 |

FOREIGN PATENT DOCUMENTS

| | | | | |
|---|---|---|---|---|
| DE | 1002137 | * | 2/1957 | 359/892 |
| GB | 2315338 A | * | 1/1998 | |
| GB | 2318146 A | * | 4/1998 | |

OTHER PUBLICATIONS

PTO–2004–4041 English–language translation of German Auslegeshrift 1,002,137, USDOC/STIC/Translations Branch, J.M. Koytcheff, translator. Jul. 2004.*

* cited by examiner

*Primary Examiner*—John Juba, Jr.
(74) *Attorney, Agent, or Firm*—Wolf, Greenfield & Sacks, P.C.

(57) ABSTRACT

A protective optical filter assembly for thin film filters having two transparent substrates facing one another and separated by a resilient element, a sealed region is formed between the transparent substrates by applying a compressive force that compresses the resilient element. The thin film filter may be contained within a carrier. The compressive force may be generated by one or more interference-fit aperture rings or threaded apertures ring, a given aperture ring may be opposed by another such aperture ring or a fixed stop. Alternatively a snap fit carrier may be used to generate the compressive force. The sealed region may have a gas having a positive pressure or a liquid.

30 Claims, 7 Drawing Sheets

PROTECTIVE OPTICAL FILTER ASSEMBLY

RELATED APPLICATIONS

This application claims the benefit of U.S. Provisional Application No. 60/348,270 filed Jan. 15, 2002, entitled "EFFICIENT FILTER ASSEMBLY," by Johnson, et al. The entirety of the above provisional application is hereby incorporated by reference.

BACKGROUND OF THE INVENTION

1. Field of Invention

This invention relates to optical filter assemblies providing protection from physical and/or environmental damage to optical components, and more particularly to optical filter assemblies providing protection to thin film filter components.

2. Related Art

Optical thin film filters (also referred to herein simply as "thin film filters") allow selective transmission of bands of electromagnetic radiation. Optical thin film filters may provide high pass, low pass, or band pass functionality using any of a number of different thin film structures. For example, thin film filters are commonly achieved by depositing one or more refractory oxide materials or elemental materials such as silver or gold onto a transparent substrate (e.g., a plate of glass).

While thin film filters have many desirable qualities, they are sensitive to many physical and environmental sources of degradation or permanent damage. For example, thin film filters may be degraded or damaged by physical contact, humidity, and abrupt temperature changes.

Conventional optical filter assemblies for protecting thin film filters from physical and environmental degradation have included bonding a protective glass plate to the outer surface of the thin film filter, or depositing a durable coating on the outer surface of the thin film filter. However, these solutions have numerous drawbacks, including wavefront distortion and/or reduction in optical efficiency due to absorption or scattering of the electromagnetic radiation by the protective material. Furthermore, conventional optical filter assemblies have resulted in increased material and labor costs, and reduced manufacturing yield due to increased handling and processing of the optical filter assembly.

Optical filter assemblies employing protective glass plates have been constructed by bonding a glass plate to a thin film filter using an adhesive that is applied on the top surface of a thin film filter. Typically, to reduce reflective losses in such systems, an adhesive is selected to be index-matched to the glass cover, and is applied over a region including the light transmitting region of the thin film filter such that the adhesive forms a continuous contact with both the thin film filter and the glass cover.

Additional drawbacks of optical filter assemblies using such adhesives include that the adhesive may shrink or expand over time thus providing a source of wavefront distortion. Such degradation of adhesives may be exacerbated by photochemically-induced changes in the adhesive, or photothermally-induced degradation caused by absorption of electromagnetic radiation transmitted through the adhesive. In addition to wavefront distortions and reductions in optical efficiency discussed above, many adhesives exhibit fluorescence in the presence of electromagnetic radiation. Such fluorescence introduces electromagentic noise into an optical system.

FIG. 1 is a cross-sectional side view of an example of a conventional protective filter assembly 100. In filter assembly 100, instead of bonding a protective material (e.g., a glass plate or a durable coating) to a thin film filter or substrate, a sealed region 155 enclosing a thin film filter 114 is formed by a soldering process. The edges of substrates 110, 120 are deposited with metal in areas 122 and coupled to carrier 140 by a solder 132 to form sealed region 155. A spacer 130 is placed between the substrates 110, 120 to maintain separation between the substrates. While soldered filter assembly 100 has advantages over other conventional filter assemblies, the added deposition and soldering processes add manufacturing steps and costs.

SUMMARY OF THE INVENTION

Accordingly, there is a need for an easily assembled protective optical filter assembly (also referred to herein simple as a "filter assembly") that provides protection for thin film filters while providing adequate optical performance, and having relatively low cost of manufacture and relatively high manufacturing yields. The above need is addressed by a filter assembly according to the present invention that forms a sealed region in which a thin film filter is maintained, by compressing two transparent substrates within a filter carrier, such that the transparent substrates and a resilient element disposed therebetween form the sealed region. The filter assembly of the invention obviates the need for bonding a glass plate over the thin film filter or depositing a durable coating on the thin film filter, and reduces the need for costly processing steps, such as soldering.

According to one aspect of the present invention, the foregoing need is addressed by a filter assembly to filter electromagnetic radiation, comprising a first transparent substrate including a first surface to transmit at least a portion of the electromagnetic radiation, the first surface having a thin film filter disposed thereon, a second transparent substrate including a second surface to transmit at least a portion of the electromagnetic radiation, a first resilient element located between the first surface and the second surface, and a compression system coupled to the first transparent substrate and the second transparent substrate to provide a compressive force therebetween, the compression system and the first resilient element aligning the first surface and the second surface to face one another.

The first surface, the second surface and the resilient element may form a sealed region.

Also, the first resilient element may align the first surface and the second surface such that they are parallel. Optionally, the filter assembly may further comprise a second thin film filter disposed on the second surface of the second transparent substrate.

In some embodiments, the compression system comprises a mechanical stop coupled to one of the first transparent substrate and the second transparent substrate, and a compression element to apply a first force comprising said compressive force to an other of the first transparent substrate and the second transparent substrate, such that the mechanical stop opposes the first force and the first resilient element is compressed by the first force.

The filter assembly may further comprise a carrier, wherein the first transparent substrate, the second transparent substrate, and the first resilient element are located in the carrier.

In some embodiments, the carrier is threaded and the compression system comprises a first threaded ring coupled to the first transparent substrate to apply a first force to the first transparent substrate and a second threaded ring coupled to the second transparent substrate to apply a second force to the second transparent substrate, such that the first compression element and the second compression element generate the compressive force, and the resilient material is compressed by the compressive force.

The resilient element may have a first flat surface and a second flat surface, such that the first surface of the first transparent substrate contacts the first flat surface and the second surface of the second transparent surface contacts the second flat surface. Optionally, the first transparent substrate has a first transparent substrate edge, and the second transparent substrate has a second transparent substrate edge, and the resilient element extends around the first transparent substrate and the second transparent substrate to contact the first transparent substrate edge and the second transparent substrate edge.

In some embodiments of the first aspect, the filter assembly further comprises a second resilient element located between the compression system and the first transparent substrate such that the second resilient element is compressed by the compressive force, and a third resilient element located between the second transparent substrate and the compression system such that the third resilient material is compressed by the compressive force.

In some embodiments, the compression system comprises a first compression element coupled to the first transparent substrate to apply a first force to the first transparent substrate and a second compression element coupled to the second transparent substrate to apply a second force to the second transparent substrate, such that the first compression element and the second compression element generate the compressive force, and such that the first resilient element is compressed by the compressive force.

In some embodiments, the compression system comprises a first carrier component and a second carrier component, the first carrier component having a first stop and the second carrier component having a second stop, and wherein the first carrier component and the second carrier component snap fit together such that the first stop is coupled to the first transparent substrate and the second stop is coupled to the second transparent substrate, and the first stop and second stop generate the compressive force. Optionally, the first resilient element may be integrated with one of the first carrier component and the second carrier component.

A second aspect of the invention is a method of providing an filter assembly, comprising providing a carrier, inserting into the carrier a first transparent substrate having a first surface having a thin film filter disposed thereon, inserting into the carrier a resilient element such that it is adjacent the first surface of the first transparent substrate, inserting into the carrier a second transparent substrate having a second surface, such that the second surface of the second transparent substrate is facing the first surface of the first transparent substrate and is separated from the first surface by the resilient element, and applying a compressive force to the first transparent substrate and to the second transparent substrate such that the resilient element is compressed. Optionally, the method may further comprise an act of forming a sealed region with the first transparent substrate, the second transparent substrate and the resilient element.

In some embodiments, the act of providing the carrier comprises providing a carrier and an interference fit compression element, and wherein the act of applying the compressive force comprises applying the interference fit compression element to the carrier. The act of applying the compressive force may comprise providing an opposing mechanical stop.

In some embodiments, the act of providing the carrier comprises providing a carrier and a threaded compression element, and wherein the act of applying the compressive force comprises applying the threaded compression element to the carrier. Optionally, the act of applying the compressive force may comprise providing an opposing mechanical stop. In other embodiments, the carrier has an axis central to the carrier, further comprising an act of centering one of the first transparent substrate and the second transparent substrate relative the axis.

In some embodiments, the act of providing the carrier comprises providing a first carrier component and a second carrier component, and wherein the act of applying a compressive force comprises snapping the first carrier component and the second carrier component together.

A third aspect of the invention is a filter assembly to filter electromagnetic radiation, comprising a first transparent substrate including a first surface to transmit at least a portion of the electromagnetic radiation, the first surface having a thin film filter disposed thereon a second transparent substrate including a second surface to transmit at least a portion of the electromagnetic radiation, a first resilient element located between the first surface and the second surface, and a means for providing a compressive force coupled to the first transparent substrate and the second transparent substrate to provide a compressive force therebetween, the means for providing a compressive force and the first resilient element aligning the first surface and the second surface to face one another.

BRIEF DESCRIPTION OF THE DRAWINGS

Illustrative, non-limiting embodiments of the present invention will be described by way of example with reference to the accompanying drawings, in which the same reference number is used to designate the same components in different figures, and in which.

DETAILED DESCRIPTION OF THE INVENTION

Figure 1:
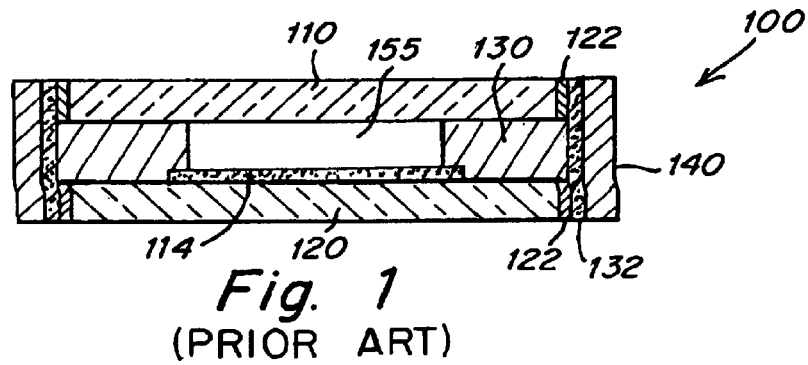
FIG. 1 is a cross-sectional side view of an example of a conventional protective optical filter assembly.
Figure 2:
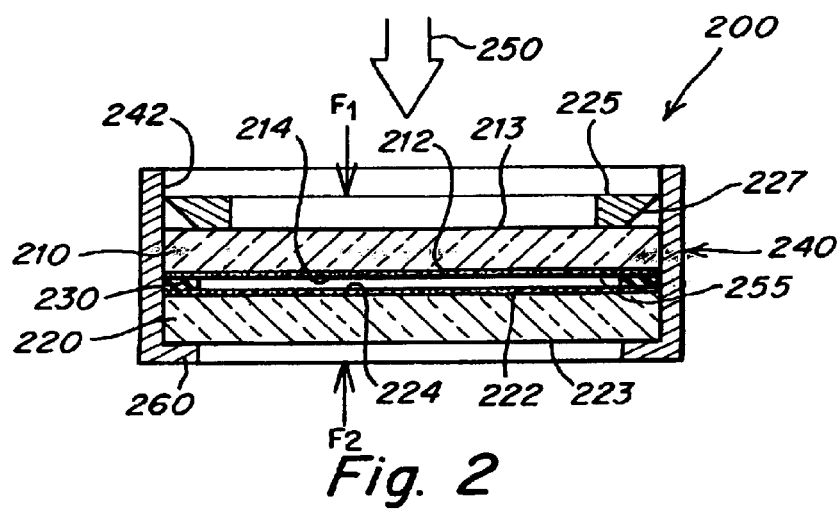
FIG. 2 is a cross-sectional side view of one example of a filter assembly according to some aspects of the present invention.

FIG. 2 is a cross-sectional side view of one example of a filter assembly 200 to filter electromagnetic radiation 250 according to some aspects of the present invention. Filter assembly 200 includes a first transparent substrate 210 and a second transparent substrate 220 disposed within a carrier 240. The term "transparent" is defined herein to mean substantially transparent to at least a selected operative wavelength or band of wavelengths of the electromagnetic radiation.

Transparent substrate 210 has a thin film filter 214 disposed on a first surface 212, and transparent substrate 220 has a thin film filter 224 disposed on a second surface 222. Optionally, a third surfaces 213 and a fourth surface 223 may be coated with an anti-reflective coating.

Transparent substrates 210 and 220 can be any suitable material sufficiently transparent to at least a portion of electromagnetic radiation 250 (i.e., the operative wavelength of filter assembly 200). Transparent substrates 210 and 220 may be a glass, plastic, fused silica or crystal material or any other suitable material known to one of ordinary skill in the art which is substantially transparent to at least a portion of electromagnetic radiation 250. Transparent substrate 210 and transparent substrate 220 are positioned in carrier 240 such that the first surface 212 and second surface 222 face one another. A resilient element 230 is located between the transparent substrates to separate the transparent substrates. In some embodiments, transparent substrate 210 and transparent substrate 220 are parallel; however, in other embodiments, transparent substrate 210 and transparent substrate 220 may have an angle formed therebetween, for example, by selecting resilient element 230 to have a non-uniform cross section.

Resilient element 230 may be an o-ring, a washer, a squirted rubber spacer, a gasket or other resilient separator known to one of ordinary skill in the art, and may be made of a metal, polymer (e.g., Viton™ a fluoroelastomer manufactured by Dupont Corp., or ethylene propylene (EPDM) having a durometer 80, shore A), or any other suitable material. Optionally resilient element 230 may be comprised of a ring having a metal core enclosed by a rubber coating.

Thin film filters 214, 224 may be any suitable single or multilayer thin film structure, such as a structure comprised of a conventional refracting oxide (e.g., aluminum oxide, zinc sulfide or cadmium sulfide) or a conventional elemental material (e.g, silver, gold, zinc). Each of thin film filters 214, and 224 may comprise a high pass filter, a low pass filter, or a bandpass filter, or any other type of filter known to one of ordinary skill in the art, and when combined may function as a high pass filter, a low pass filter, a bandpass filter or any other type of filter known to one of ordinary skill in the art. In some embodiments, one of thin film filter 214 and 224 is a high pass filter and the other is a low pass filter, such that when combined they form a band pass filter. In some embodiments, thin film filters 214 and 224 are disposed to extend at least adjacent to resilient element 230, and preferably between substrates 210, 220 and resilient element 230 to prevent electromagnetic radiation 250 from passing through filter assembly 200 without passing through thin film filter 214 and/or thin film filter 224. In some embodiments, the thin film filters 214, 224 do not extend to the edge of the substrates 210, 220 so as to prevent hydroscoping (e.g., wicking) of moisture between substrate 210, 220 and resilient element 230 via the film filters. Although in the illustrated embodiment, both transparent substrate 210 and transparent substrate 220 have thin film filters deposited thereon, in some embodiments only one of transparent substrate 210 and 220 has a film deposited thereon.

In filter assembly 200, transparent substrate 210 and transparent substrate 220 are positioned within carrier 240 using a compression system providing forces $F_1$ and $F_2$. In the illustrated embodiment, the compression system comprises a compression element 225 (providing force $F_1$) and a mechanical stop 260 (providing force $F_2$). In some embodiments, stop 260 is fixedly located relative to carrier 240, and may be integrated with carrier 240. For example, stop 260 and carrier 240 may comprise a single machined or injection molded part.

In filter assembly 200, compression element 225 and stop 260 provide a compressive force via transparent substrate 210 and transparent substrate 220, such that transparent substrate 210 and transparent substrate 220 are compressed in the direction of one another. Resilient element 230 located between the first surface 212 and second surface 222 separates surface 212 and surface 222, and aligns surface 212 and surface 222 in response to the compressive force.

In some embodiments, resilient element 230 is in intimate contact with transparent substrate 210 and transparent substrate 220 so as to form a sealed region 255 in which thin film filter 214 and thin film filter 224 are located. Sealed region 255 is formed by transparent substrate 210, transparent substrate 220, and resilient element 230. By forming a sealed region, thin film filters 214 and 224 are protected from humidity and sudden temperature changes. In some embodiments, this structure is sufficient to provide sealed region 255 that may be hermetically sealed (e.g., filter assembly 200 may pass military specification MIL STD 810E).

Region 255 may be filled with ordinary air from a manufacturing facility in which the assembly is manufactured; in procedures where region 255 is filled with ordinary air, the air may be filtered of particles and conditioned to have a relatively low humidity. Optionally, region 255 may be filled with a selected gas (e.g., helium or nitrogen); in some embodiments, the gas may have a positive pressure (i.e., a pressure greater than atmospheric air pressure). Alternatively, region 255 may be filled with a liquid. A liquid used to fill region 255 is preferably non-hydroscopic and does not chemically react with thin film filters 214 and 224. As described below, in some embodiments of filter assembly 200, one of substrates 210, 220 may not have a thin film filter; in such embodiments, the liquid in region 255 may be selected to have an index of refraction closely matched to the index of refraction of an uncoated substrates 210 or 220 to minimize reflections.

Figure 4A:
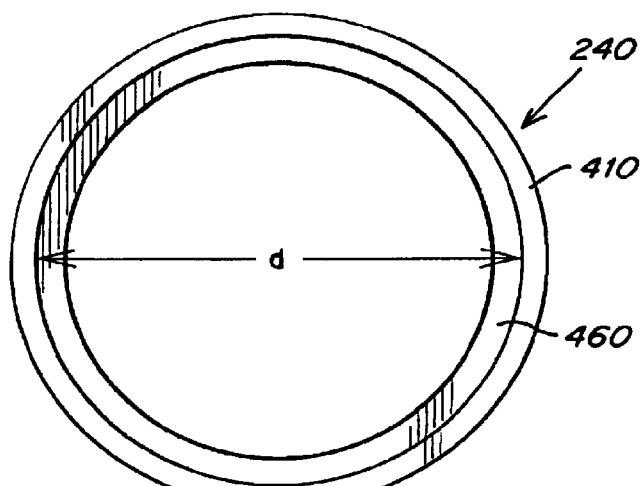
FIG. 4A is a top view of an example of an embodiment of a carrier.

Compression element 225 may be any element capable of applying a force $F_1$ such that resilient element 230 aligns and separates surface 212 and surface 222. For example, compression element 225 may be a press-fit aperture ring that is interference fit with an interior surface 242 of carrier 240. In some embodiments, an edge 227 of compression element 225 is tapered to form a contact point with the interior surface 242 of carrier 240 to facilitate the generation of force $F_1$. Carrier 240 and compression element 225 may be made of a metal, plastic or any other suitable material. The interior diameter of carrier 240 and the outer diameter of compression element 225 may be selected using known design techniques to form an interference fit and generate the compressive force. Referring to FIG. 4A, the interior diameter of carrier 240 is illustrated using reference number d; and referring to FIG. 5, outer diameter of compression element 225 is illustrated using reference number D. To achieve an interference fit, D is chosen to be greater than d.

While filter assembly 200 has two substrates 210 and 220, and two thin film filters 214 and 224, it is understood that one or more additional optical elements may be added to filter assembly 200. For example, an optical absorption filter (not shown) to block bands of light outside of the bands filtered by thin film filters 214 and 224 may be added. An optical absorption filter may be used because, while thin film filters 214 and 224 typically have a sharp cutoff at a selected frequency, they may not have broadband blocking capabilities; accordingly, an optical absorption filter may be used to compliment the filtering of thin film filters 214 and 224. For example, if a filter assembly is to block light having wavelengths greater than 750 nm, a thin film filter 214 may provide a sharp cutoff in the region of 750 nm and block light in the region 750 nm to 850 nm, but transmit a significant portion of light having a wavelength greater than 850 nm; accordingly, a blocking filter may be added to the assembly to block light having wavelengths 850 nm and greater; it is to be understood that in such a filter assembly, a second thin film filter 224 may be unnecessary. A blocking filter may be located anywhere in filter assembly 200. For example, a blocking filter may be located between compression element 225 and substrate 210 or between stop 260 and substrate 220.

Additionally, the blocking filter may be held in place by compression forces $F_1$ and $F_2$, or may be held by an adhesive. It is to be appreciated that it may be possible to use an adhesive which may be fluorescent in a given spectral region of electromagnetic radiation 250 if the blocking filter blocks the portion of electromagnetic radiation 250 in the given spectral region (i.e., the portion which causes the fluorescence). Accordingly, it may be beneficial to locate a blocking filter such that it filters electromagnetic radiation 250 prior to the radiation reaching the adhesive.

Figure 3A:
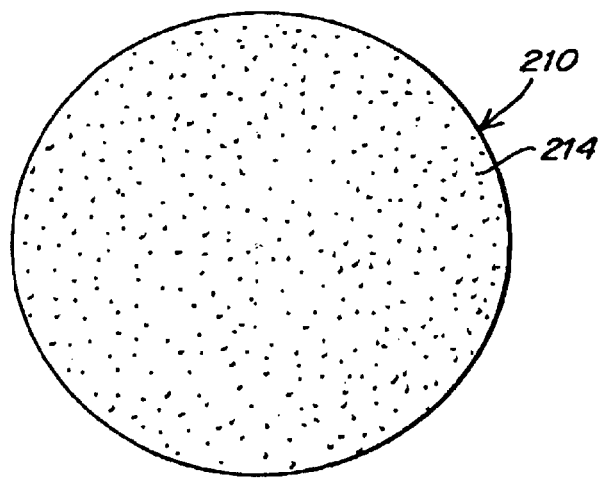
FIG. 3A is a top view of an example of an embodiment of a transparent substrate.
Figure 3B:
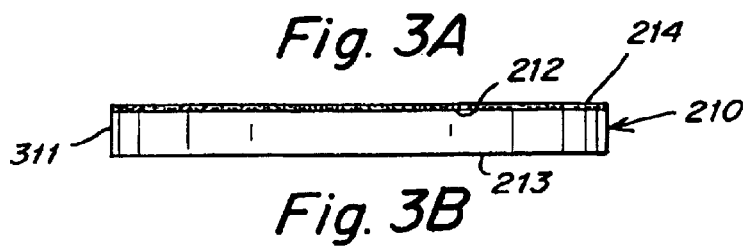
FIG. 3B is a side view of an example of an embodiment of a transparent substrate.

FIG. 3A is a top view of an example of an embodiment of a transparent substrate 210. While the illustrated embodiment of a transparent substrate is circular for use with a circular filter assembly, one of ordinary skill would understand that a transparent substrate or filter assembly may be rectangular or any other suitable shape. FIG. 3B is a side view of transparent substrate 210, having a first surface 212, a second surface 213, and an edge 311. As stated above, transparent substrate 210 may have a thin film filter 214 disposed on surface 212.

Figure 4B:
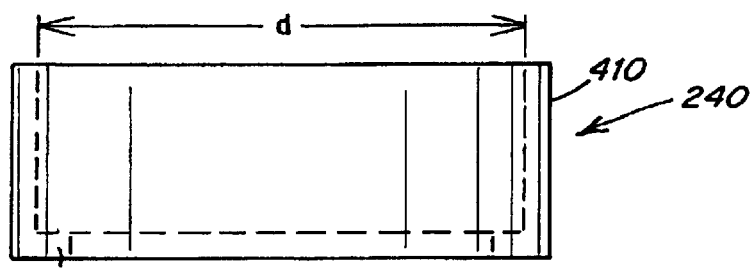
FIG. 4B is a cross-sectional side view of an example of an embodiment of a carrier.

FIG. 4A is a top view of an example of an embodiment of a carrier 240 according to some aspects of the present invention. Carrier 240 has an outer wall 410 having an inner diameter d and an integrated mechanical stop 460 (e.g., stop 260 in FIG. 2). FIG. 4B is a cross-sectional side view of carrier 240 illustrating stop 460 and inner diameter d.

Figure 5A:
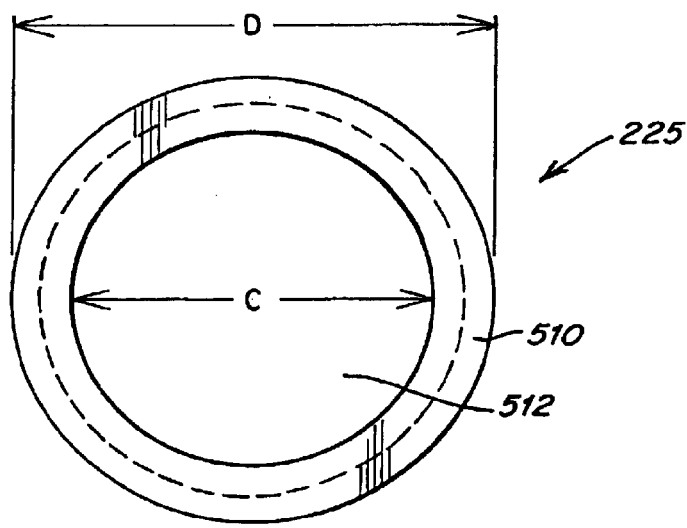
FIG. 5A is a top view of one example of an embodiment of a compression element.
Figure 5B:
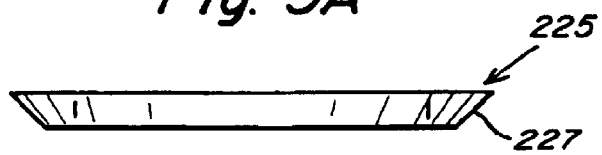
FIG. 5B is a side view of one example of an embodiment of a compression element.

FIG. 5A is a top view of one example of an embodiment of a compression element 225. Compression element 225 comprises an aperture ring 510 (also referred to herein as a ring) for use in combination with carrier 240 of FIG. 4A. Compression element 225 has a void region 512 in the middle to transmit electromagnetic radiation, and an outer diameter D that is larger than inner diameter d of the carrier 240 (visible in FIG. 4A) to create an interference fit with carrier 240 of FIG. 4A. Inner diameter C may be selected to provide a desired clear aperture of a filter assembly employing compression element 225 so as to allow electromagnetic energy to be propagated through at least a portion of the thin film filter. FIG. 5B is a side view of compression element 225 having a tapered edge 227. As discussed above, tapering edge 227 facilitates the generation of a compressive force.

Figure 6:
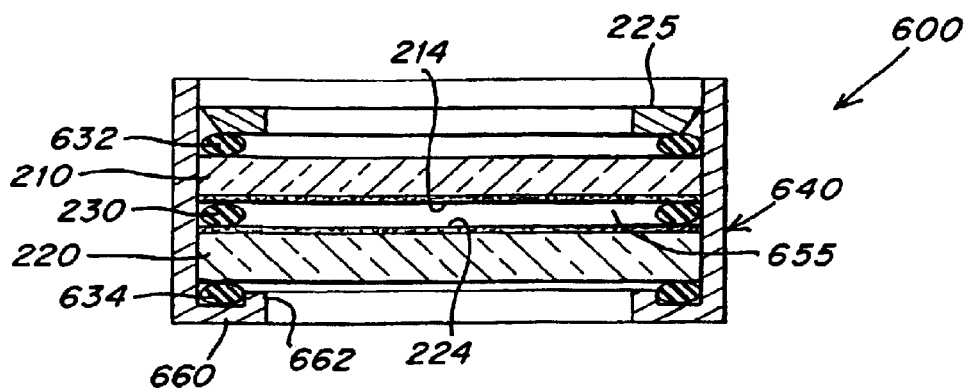
FIG. 6 is a cross-sectional side view of a second example of a filter assembly according to some aspects of the present invention.

FIG. 6 is a cross-sectional side view of a second example of an filter assembly 600 according to some aspects of the present invention. In filter assembly 600, in addition to a resilient element 230, a resilient element 634 is located between transparent substrate 220 and stop 660 and a resilient element 632 is located between compression element 225 and transparent substrate 210. Accordingly, resilient elements 230, 632, and 634 in combination with transparent substrates 210, 220 provide sealing of region 655. In some embodiments, resilient elements 632, 634 enhance the sealing of region 655, and in some embodiments, resilient elements 632 and 634 form sealed region 655 and resilient element 230 simply acts to separate transparent substrate 210 and transparent substrate 220.

In some embodiments, one or more of resilient elements 230, 632, and 634 are substantially opaque at an operative wavelength of filter assembly 600 to prevent light from being transmitted by assembly 600 in regions of transparent substrates 210 and 220 other than in designated regions which are filtered by thin film filters 214 and 224. Optionally, carrier 640 may have a stop 660 having a lip 662 to contain resilient element 634 and protect the resilient element from excessive pressure during manufacture.

Figure 7:
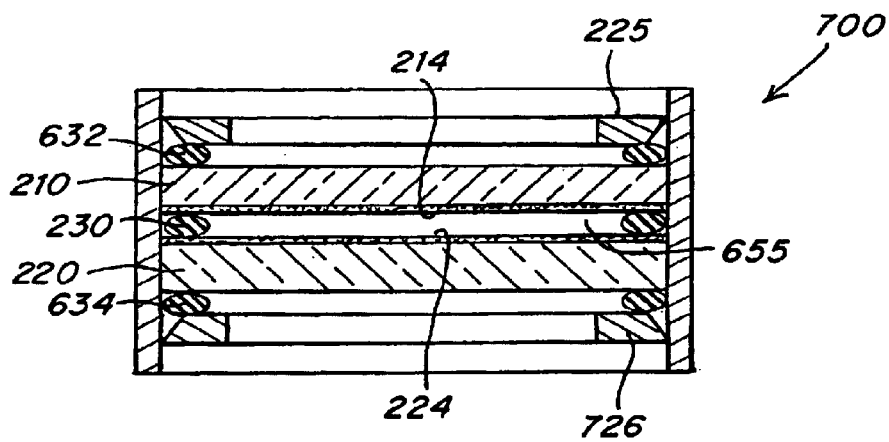
FIG. 7 is a cross-sectional side view of a third example of a filter assembly according to some aspects of the invention.

FIG. 7 is a cross-sectional side view of a third example of an filter assembly 700 according to some aspects of the present invention, in which compression element 225 operates in combination with a second compression element 726 (rather than a fixed stop as in filter assembly 600 of FIG. 6) to generate a compressive force. Accordingly, the fixed stop (e.g., stop 660 in FIG. 6) may be omitted. Otherwise, the elements of FIG. 7 are the same as those of FIG. 6 and for the sake of brevity the discussion is omitted.

Figure 8:
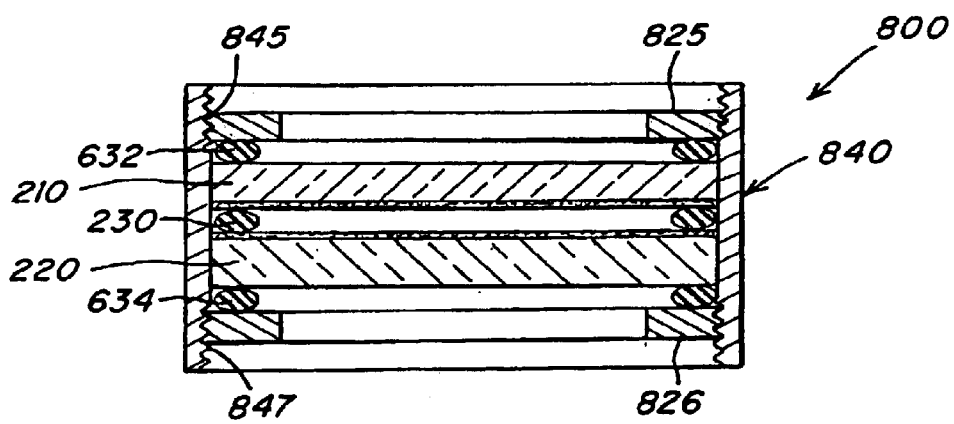
FIG. 8 is a cross-sectional side view of a fourth example of a filter assembly according to some aspects of the invention.

FIG. 8 is a cross-sectional side view of a fourth example of an filter assembly 800 according to some aspects of the invention, in which compression elements 825 and 826 are threaded rather than press fit. Carrier 840 is threaded at regions 845 and 847 on an interior surface of carrier 840 to allow threaded compressive elements 825 and 826 to be rotated in a manner to generate a compressive force which compresses resilient elements 230, 632, 634.

It is to be appreciated that various modifications readily apparent to one of skill in the art, although not specifically identified herein, are within the scope of the of this disclosure. For example, although filter assembly 800 is illustrated as having three resilient elements, the filter assembly may have only a single resilient member 230. Also, although filter assembly 800 is illustrated as having two threaded compression elements 825, 826, filter assembly 800 may have only one threaded compression element operating in combination with a fixed stop (e.g., a stop integrated with carrier 840), or any other compressive element described herein to generate a compressive force.

Figure 9A:
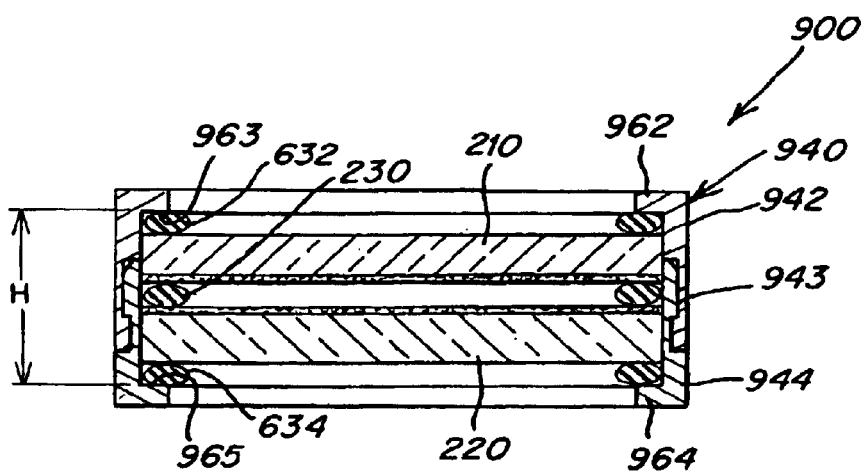
FIG. 9A is a cross-sectional side view of a fifth example of a filter assembly according to some aspects of the invention.

FIG. 9A is a cross-sectional side view of a fifth example of a filter assembly 900 according to some aspects of the invention. Carrier 940 is comprised of a first carrier component 942 having a fixed stop 962 and a second carrier component 944 having a fixed stop 964. Carrier components 942 and 944 may be constructed according to any suitable snap fit structure, such that a snap-fit joint 943 is formed where carrier components 942 and 944 interface. The carrier components may be made of any suitable material such as an injection molded polymer.

Dimension H is the dimension between the internal wall 963 of stop 962, and internal wall 965 of stop 964 when carrier components 942 and 944 are snapped together. Dimension H is selected such that a compressive force is generated to compress resilient elements 230, 632, and 634.

It is to be appreciated that various modifications readily apparent to one of skill in the art, although not specifically identified herein, are within the scope of the of this disclosure. For example, although filter assembly 900 is illustrated as having three resilient elements, the filter assembly may have only a resilient member 230. Also, although filter assembly 900 is snap fit together, it is be understood that carrier components 942 and 944 may be screwed together or held together using any other suitable method.

Figure 9B:
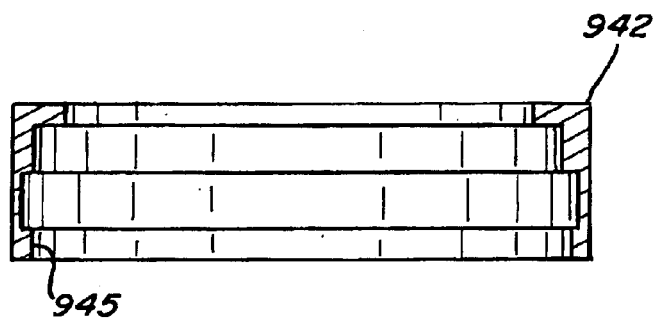
FIG. 9B is cross-sectional side view of an exemplary embodiment of first carrier component.
Figure 9C:
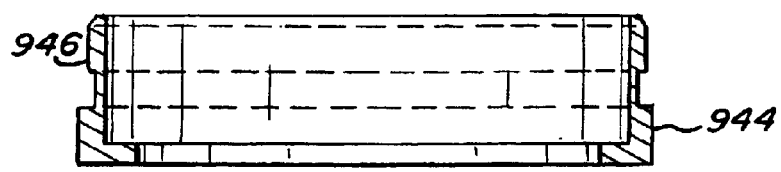
FIG. 9C is cross-sectional side view of an exemplary embodiment of second carrier component.

FIGS. 9B and 9C are cross-sectional side views of exemplary embodiments of first carrier component 942 and second carrier component 944, respectively. First carrier component 942 and second carrier component 944 have mating surfaces 945 and 946 along which snap-fit joint 943 (visible in FIG. 9A above) is formed.

Figure 10:
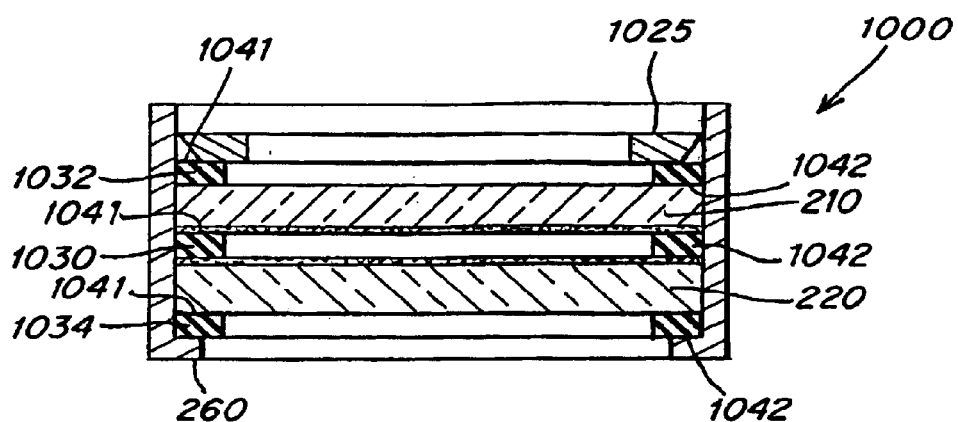
FIG. 10 is a cross-sectional side view of a sixth example of a filter assembly according to some aspects of the invention.

FIG. 10 is a cross-sectional side view of a sixth example of a filter assembly 1000 according to some aspects of the invention. In filter assembly 1000, resilient members 1030, 1032, 1034 have a square or rectangular cross section having flat upper surface 1041 and flat lower surfaces 1042 to interface with compression element 1025, stop 260 and transparent substrates 210 and 220 as illustrated. Although filter assembly 1000 is illustrated as having three resilient elements, the filter assembly may have only resilient member 1030. Also, although filter assembly 1000 is illustrated as having an interference-fit compression element 1025, filter assembly 1000 may be constructed with any other compression system described herein.

Figure 11:
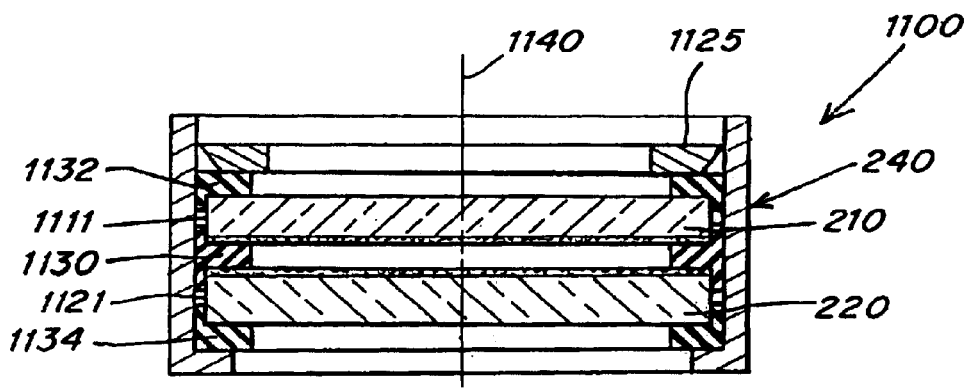
FIG. 11 is a cross-sectional side view of a seventh example of a filter assembly according to some aspects of the invention.

FIG. 11 is a cross-sectional side view of a seventh example of an filter assembly 1100 according to some aspects of the invention, which has resilient elements 1130, 1132, and 1134 that extend around the edges 1111, 1121 of the transparent substrates 210 and 220, and contact the edges as illustrated, to center the transparent substrates within carrier 240. That is, the transparent substrates are centered about an axis 1140 central to carrier 240.

It is to be appreciated that various modifications readily apparent to one of skill in the art, although not specifically identified herein, are within the scope of the of this disclosure. For example, although filter assembly 1100 is illustrated as having three resilient elements, the filter assembly may have only resilient member 1130. Also, although filter assembly 1100 is illustrated as having a compression system comprising an interference-fit compression elements 1125, filter assembly 1100 may be constructed with any other compression system described herein.

Figure 12:
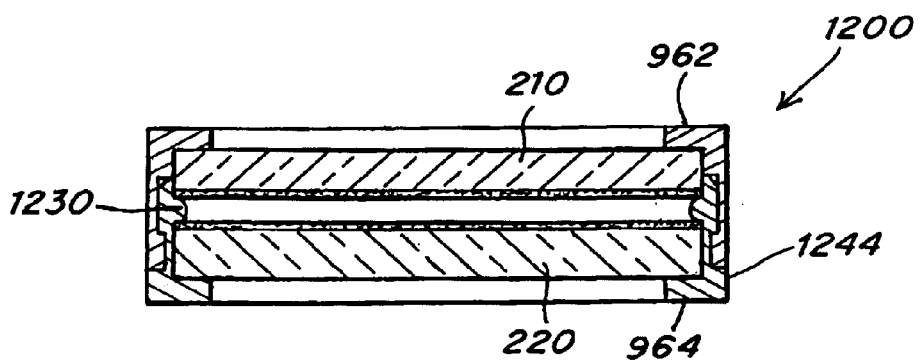
FIG. 12 is a cross-sectional side view of an eighth example of a filter assembly according to some aspects of the invention.

FIG. 12 is a cross-sectional side view of a eighth example of an filter assembly 1200 according to some aspects of the invention. Filter assembly 1200 is a snap fit structure which is the same as the structure illustrated in FIG. 9A above, except resilient element 1230 is integrated with carrier component 1244. For example, carrier component 1244 is injection molded to generate a protrusion which forms resilient element 1230.

It is to be appreciated that various modifications readily apparent to one of skill in the art, although not specifically identified herein, are within the scope of the of this disclosure. For example, although filter assembly 1200 is illustrated with a single resilient element, additional resilient elements (not shown) may be located between transparent substrate 210 and stop 962, and between substrate 220 and stop 964. The additional resilient elements can be integrated with a carrier component or separate. Also, although filter assembly 1200 is snap fit together, it is be understood that integrated resilient elements may be used with carrier components that are screwed together or held together using any other suitable method.

Figure 13A:
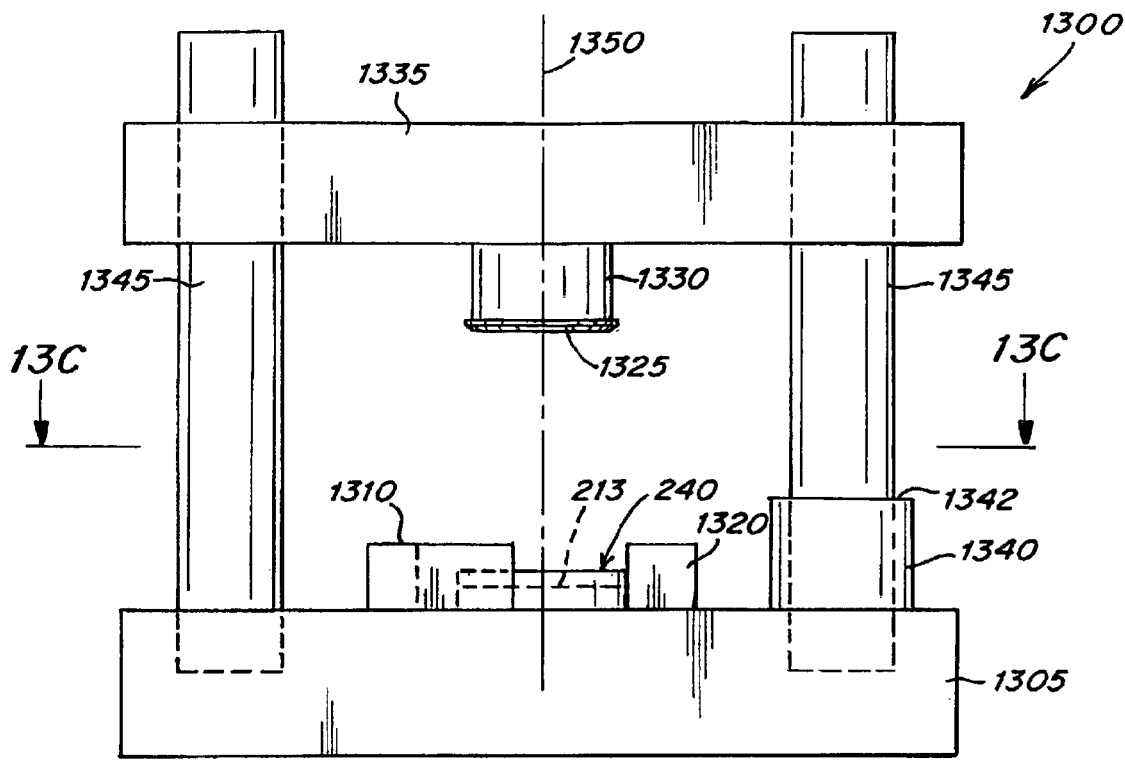
FIG. 13A is a schematic side view of one example of an filter assembly manufacture unit for manufacturing filter assemblies.

FIG. 13A is a schematic side view of one example of a filter assembly manufacture unit 1300 for manufacturing filter assemblies. Manufacture unit 1300 is useful for manufacturing embodiments of filter assemblies having a compression system that is comprised of a press-fit aperture ring 1325 that is interference fit with an interior surface of carrier 240, such as the filter assembly described above with reference to FIG. 2.

As described in greater detail with reference to FIG. 13C, a carrier 240 of a partially-assembled filter assembly (i.e., assembly 200 of FIG. 2 having all components except a press-fit aperture ring 1325) is positioned on a base 1305 between a fixed stop 1310 and an alignment stop 1320. Base 1305 may be bolted to a table or counter (not shown) for stability. Press fit aperture ring 1325 is positioned on a mandrel 1330. FIG. 13B, is a schematic, cross-sectional view of mandrel 1330 and press fit aperture ring 1325 positioned on mandrel 1330. Mandrel 1330 uses mount feature 1332 for alignment, and a vacuum-pressurized holding mechanism for applying a vacuum pressure thru holes 1334 to hold press-fit aperture ring 1325. Alternatively, any other suitable holding mechanism known to one of ordinary skill in the art may be used to hold press fit aperture ring 1325 on mandrel 1330.

Referring again to FIG. 13A, mandrel 1330 is connected to a crossbar 1335, and mandrel 1330 moves along guide rails 1345 to allow contact between press-fit aperture ring 1325 and surface 213. The crossbar may be moved along the guide rails using a hydraulic pressure system (not shown) or any other mechanism. The pressure applied between press-fit aperture ring 1325 and surface 213 can be controlled by the hydraulic pressure system. Alternatively, a block 1340 having a flat surface 1342 and precise height may stop the crossbar 1335 at a selected sight such that an appropriate pressure is applied between press-fit aperture ring 1325 and surface 213. Each of base 1305, guide rails 1345, crossbar 1335, and mandrel 1330 should be precisely manufactured using a mechanically stable material such as steel or cold-hardened steel to align both press-fit aperture ring 1325 and carrier 240 of partially-assembled filter assembly along centerline 1350.

Figure 13C:
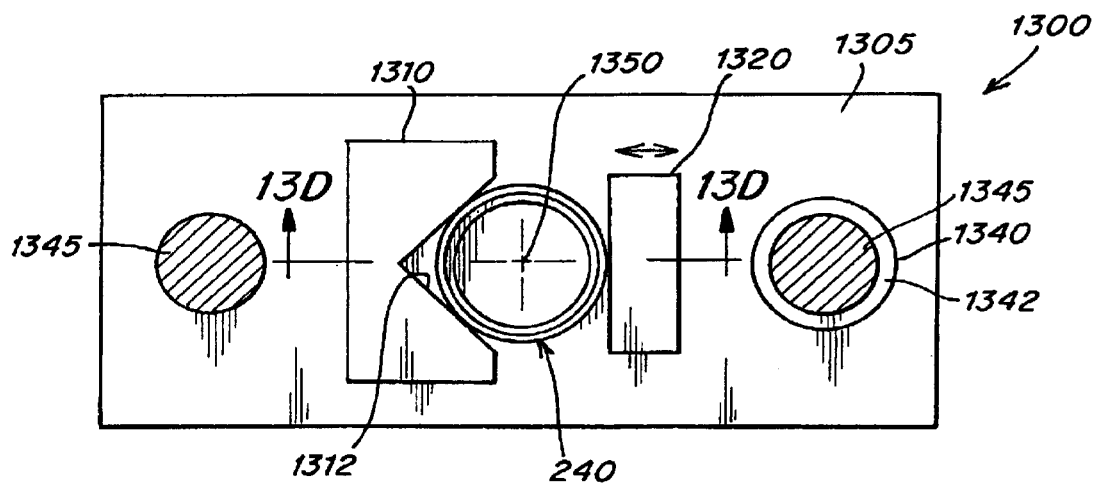
FIG. 13C is schematic top view of an filter assembly manufacture unit taken along line 13C—13C of FIG. 13A.
Figure 13B:
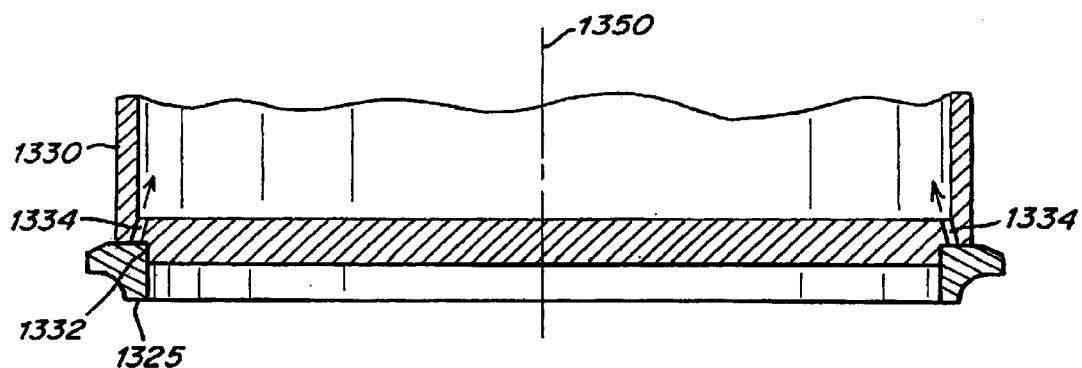
FIG. 13B, is an expanded, schematic, cross-sectional view of a mandrel and a press fit aperture ring positioned on the mandrel using mount feature for alignment.

FIG. 13C is schematic top view of filter assembly manufacture unit 1300 taken along line 13C—13C of FIG. 13A. FIG. 13C illustrates a carrier 240 of partially-assembled filter assembly positioned on base 1305 between fixed stop 1310 and alignment stop 1320. Alignment stop 1320 is movable and may be spring-loaded to position carrier 240 of a partially-assembled filter assembly into wedge 1312 of fixed stop 1310. Carrier 240 of a partially-assembled filter assembly is thereby centered along centerline 1350.

Figure 13D:
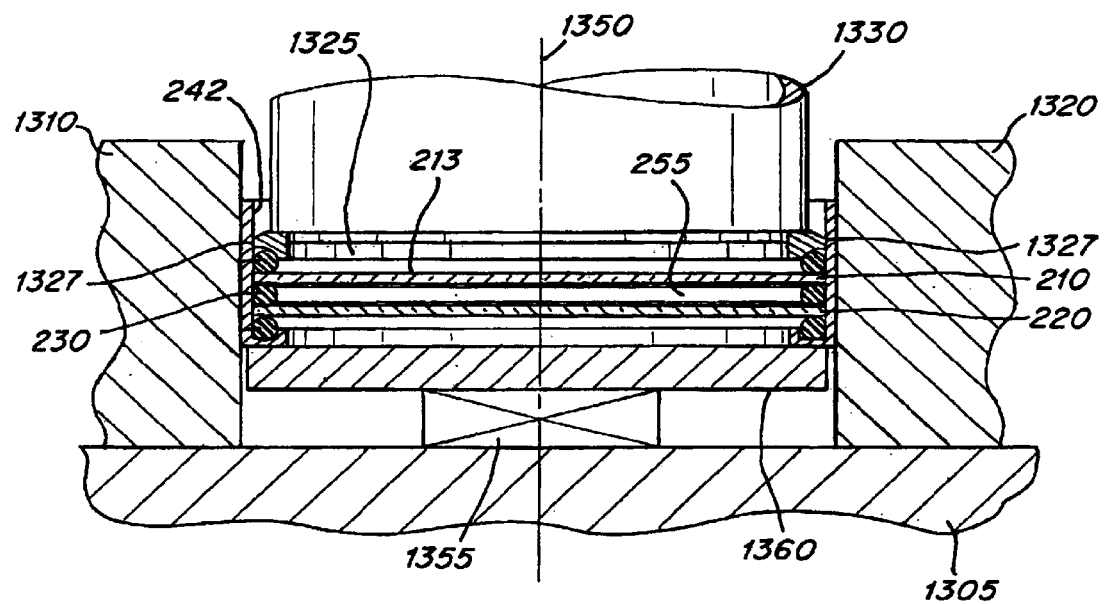
FIG. 13D is an expanded, cross-sectional, schematic side view of a filter assembly manufacture unit and a filter assembly taken along line 13D—13D of FIG. 13C.

FIG. 13D is a cross-sectional, schematic side view of filter assembly manufacture unit 1300 and a filter assembly taken along line 13D—13D of FIG. 13C. In FIG. 13D, mandrel 1330 maintains press-fit aperture ring 1325 along centerline 1350 and positions press-fit aperture ring 1325 to make contact with surface 213. Optionally, a plate 1360 and a spring 1355 coupled to base 1305 may be used to lift an assembled filter assembly from between fixed stop 1310 and alignment stop 1320 as mandrel 1330 is removed. The holding mechanism (e.g., the vacuum mechanism described above) used to hold press-fit aperture ring 1325 on mandrel 1330 should allow the press-fit (i.e., the interference between press-fit aperture ring 1325 and interior surface 242 of carrier 240 formed at points 1327) to overcome the holding force between press fit aperture ring 1325 and mandrel 1330, such that mandrel 1330 can be lifted and separated from press fit aperture ring 1325 to form an assembled filter assembly.

It is to be understood that the filter assembly as illustrated in FIG. 13D is manufactured by sequentially placing each of substrate 220, resilient element 230, and substrate 210 into carrier 240. A filter assembly having a liquid in sealed region 255 may be produced by adding a precisely measured amount of the liquid after placing substrate 220 and before placing substrate 210. Alternatively, a filter assembly having a positive pressure in sealed region 255 may be produced by assembling the filter assembly in a suitably pressurized environment of a selected gas. As one of ordinary skill would understand, any additional elements as described herein above may be added to an assembly process as desired or required.

Having thus described the inventive concepts and a number of exemplary embodiments, it will be apparent to those skilled in the art that the invention may be implemented in various ways, and that modifications and improvements will readily occur to such persons. Thus, the examples given are not intended to be limiting. The invention is limited only as required by the following claims and equivalents thereto.

What is claimed is:

1. A filter assembly to filter electromagnetic radiation, comprising:
    a first transparent substrate including a first surface to transmit at least a portion of the electromagnetic radiation, the first surface having a thin film filter disposed thereon;
    a second transparent substrate including a second surface to transmit at least a portion of the electromagnetic radiation;
    a first resilient element located between the first surface and the second surface;
    a compression system coupled to the first transparent substrate and the second transparent substrate to provide a compressive force therebetween, the compression system and the first resilient element aligning the first surface and the second surface to face one another;
    a second resilient element located between the compression system and the first transparent substrate such that the second resilient element is compressed by the compressive force; and
    a third resilient element located between the second transparent substrate and the compression system such that the third resilient material is compressed by the compressive force.

2. The filter assembly of claim 1, wherein the first surface, the second surface and the resilient element form a sealed region.

3. The filter assembly of claim 1, wherein the first resilient element aligns the first surface and the second surface such that they are parallel.

4. The filter assembly of claim 1, further comprising a second thin film filter disposed on the second surface of the second transparent substrate.

5. The filter assembly of claim 1, wherein the compression system comprises a mechanical stop coupled to one of the first transparent substrate and the second transparent substrate, and a compression element to apply a first force comprising said compressive force to an other of the first transparent substrate and the second transparent substrate, such that the mechanical stop opposes the first force and the first resilient element is compressed by the first force.

6. The filter assembly of claim 5, further comprising a carrier, wherein the first transparent substrate, the second transparent substrate, and the first resilient element are located in the carrier.

7. The filter assembly of claim 6, wherein the carrier is threaded and wherein the compression system comprises a first threaded ring coupled to the first transparent substrate to apply a first force to the first transparent substrate and a second threaded ring coupled to the second transparent substrate to apply a second force to the second transparent substrate, such that the first compression element and the second compression element generate the compressive force, and the resilient material is compressed by the compressive force.

8. The filter assembly of claim 1, wherein the resilient element has a first flat surface and a second flat surface, such that the first surface of the first transparent substrate contacts the first flat surface and the second surface of the second transparent surface contacts the second flat surface.

9. The filter assembly of claim 8, wherein the first transparent substrate has a first transparent substrate edge, and the second transparent substrate has a second transparent substrate edge, and the resilient element extends around the first transparent substrate and the second transparent substrate to contact the first transparent substrate edge and the second transparent substrate edge.

10. The filter assembly of claim 1, wherein the compression system comprises a first compression element coupled to the first transparent substrate to apply a first force to the first transparent substrate and a second compression element coupled to the second transparent substrate to apply a second force to the second transparent substrate, such that the first compression element and the second compression element generate the compressive force, and such that the first resilient element is compressed by the compressive force.

11. The filter assembly of claim 1, further comprising a carrier in which the first transparent substrate, the second transparent substrate, and the first resilient element are located.

12. The filter assembly of claim 11, wherein the carrier is threaded and wherein the compression system comprises a first threaded ring coupled to the first transparent substrate to apply a first force to the first transparent substrate and a second threaded ring coupled to the second transparent substrate to apply a second force to the second transparent substrate, such that the first compression element and the second compression element generate the compressive force, and the first resilient element is compressed by the compressive force.

13. The filter assembly of claim 1, wherein the compression system comprises a first carrier component and a second carrier component, the first carrier component having a first stop and the second carrier component having a second stop, and wherein the first carrier component and the second carrier component snap fit together such that the first stop is coupled to the first transparent substrate and the second stop is coupled to the second transparent substrate, and the first stop and second stop generate the compressive force.

14. The filter assembly of claim 1, wherein the first resilient element extends around the periphery of the first surface and the second surface.

15. A filter assembly to filter electromagnetic radiation, comprising:
a first transparent substrate including a first surface to transmit at least a portion of the electromagnetic radiation, the first surface having a thin film filter disposed thereon;
a second transparent substrate including a second surface to transmit at least a portion of the electromagnetic radiation;
a first resilient element located between the first surface and the second surface; and
a compression system coupled to the first transparent substrate and the second transparent substrate to provide a compressive force therebetween, the compression system and the first resilient element aligning the first surface and the second surface to face one another;
wherein the compression system comprises a first carrier component and a second carrier component, the first carrier component having a first stop and the second carrier component having a second stop, and wherein the first carrier component and the second carrier component snap fit together such that the first stop is coupled to the first transparent substrate and the second stop is coupled to the second transparent substrate, and the first stop and second stop generate the compressive force; and
wherein the first resilient element is integrated with one of the first carrier component and the second carrier component.

16. A filter assembly to filter electromagnetic radiation, comprising:
a first transparent substrate including a first surface to transmit at least a portion of the electromagnetic radiation, the first surface having a thin film filter disposed thereon;
a second transparent substrate including a second surface to transmit at least a portion of the electromagnetic radiation;
a first resilient element located between the first surface and the second surface;
means for providing a compressive force coupled to the first transparent substrate and the second transparent substrate to provide a compressive force therebetween, the means for providing a compressive force and the first resilient element aligning the first surface and the second surface to face one another;
a second resilient element located between the means for providing a compressive force and the first transparent substrate such that the second resilient element is compressed by the compressive force; and
a third resilient element located between the second transparent substrate and the means for providing a compressive force such that the third resilient material is compressed by the compressive force.

17. The filter assembly of claim 16, wherein the first surface, the second surface and the resilient element form a sealed region.

18. The filter assembly of claim 16, wherein the first resilient element aligns the first surface and the second surface such that they are parallel.

19. The filter assembly of claim 16, further comprising a second thin film filter disposed on the second surface of the second transparent substrate.

20. The filter assembly of claim 16, wherein the means for providing a compressive force comprises a mechanical stop coupled to one of the first transparent substrate and the second transparent substrate, and a compression element to apply a first force comprising said compressive force to another of the first transparent substrate and the second transparent substrate, such that the mechanical stop opposes the first force and the first resilient element is compressed by the first force.

21. The filter assembly of claim 20, further comprising a carrier, wherein the first transparent substrate, the second transparent substrate, and the first resilient element are located in the carries.

22. The filter assembly of claim 21, wherein the carrier is threaded and wherein the means for providing a compressive force comprises a first threaded ring coupled to the first transparent substrate to apply a first force to the first transparent substrate and a second threaded ring coupled to the second transparent substrate to apply a second force to the second transparent substrate, such that the first compression element and the second compression element generate the compressive force, and the resilient material is compressed by the compressive force.

23. The filter assembly of claim 16, wherein the resilient clement has a first flat surface and a second flat surface, such that the first surface of the first transparent substrate contacts the first flat surface and the second surface of the second transparent surface contacts the second flat surface.

24. The filter assembly of claim 23, wherein the first transparent substrate has a first transparent substrate edge, and the second transparent substrate has a second transparent substrate edge, and the resilient element extends around the first transparent substrate and the second transparent substrate to contact the first transparent substrate edge and the second transparent substrate edge.

25. The filter assembly of claim 16, wherein means for providing a compressive force comprises a first compression element coupled to the first transparent substrate to apply a first force to the first transparent substrate and a second compression element coupled to the second transparent substrate to apply a second force to the second transparent substrate, such that the first compression element and the second compression element generate the compressive force, and such that the first resilient element is compressed by the compressive force.

26. The filter assembly of claim 16, further comprising a carrier in which the first transparent substrate, the second transparent substrate, and the first resilient element are located.

27. The filter assembly of claim 26, wherein the carrier is threaded and wherein the means for providing a compressive force comprises a first threaded ring coupled to the first transparent substrate to apply a first force to the first transparent substrate and a second threaded ring coupled to the second transparent substrate to apply a second force to the second transparent substrate, such that the first compression element and the second compression element generate the compressive force, and the first resilient element is compressed by the compressive force.

28. The filter assembly of claim 16, wherein the means for providing a compressive force comprises a first carrier component and a second carrier component, the first carrier component having a first stop and the second carrier component having a second stop, and wherein the first carrier component and the second carrier component snap fit together such that the first stop is coupled to the first transparent substrate and the second stop is coupled to the second transparent substrate, and the first stop and second stop generate the compressive force.

29. The filter assembly of claim 16, wherein the first resilient element extends around the periphery of the first surface and the second surface.

30. A filter assembly to filter electromagnetic radiation, comprising:

- a first transparent substrate including a first surface to transmit at least a portion of the electromagnetic radiation, the first surface having a thin film filter disposed thereon;

- a second transparent substrate including a second surface to transmit at least a portion of the electromagnetic radiation;

- a first resilient element located between the first surface and the second surface; and

- means for providing a compressive force coupled to the first transparent substrate and the second transparent substrate to provide a compressive force therebetween, the means for providing a compressive force and the first resilient element aligning the first surface and the second surface to face one another;

- wherein the means for providing a compressive force comprises a first carrier component and a second carrier component, the first carrier component having a first stop and the second carrier component having a second stop, and wherein the first carrier component and the second carrier component snap fit together such that the first stop is coupled to the first transparent substrate and the second stop is coupled to the second transparent substrate, and the first stop and second stop generate the compressive force; and

- wherein the first resilient element is integrated with one of the first carrier component and the second carrier component.

* * * * *

UNITED STATES PATENT AND TRADEMARK OFFICE
CERTIFICATE OF CORRECTION

PATENT NO. : 6,918,673 B2
DATED : July 19, 2005
INVENTOR(S) : Johnson et al.

It is certified that error appears in the above-identified patent and that said Letters Patent is hereby corrected as shown below:

Column 14,
Line 33, delete "carries." and replace with -- carrier. --.
Line 44, delete "clement" and replace with -- element --.

Signed and Sealed this

Eighth Day of November, 2005

JON W. DUDAS
*Director of the United States Patent and Trademark Office*